United States Patent
Hartman et al.

(10) Patent No.: US 7,467,252 B2
(45) Date of Patent: Dec. 16, 2008

(54) CONFIGURABLE I/O BUS ARCHITECTURE

(75) Inventors: Charles Hartman, Fort Collins, CO (US); Raphael Gay, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 249 days.

(21) Appl. No.: 10/629,940

(22) Filed: Jul. 29, 2003

(65) Prior Publication Data
US 2005/0027917 A1  Feb. 3, 2005

(51) Int. Cl.
*G06F 13/00* (2006.01)
*G06F 13/36* (2006.01)
*G03G 15/01* (2006.01)

(52) U.S. Cl. .............. 710/316; 710/302; 710/306; 710/311; 399/301

(58) Field of Classification Search ............ 710/316, 710/306, 301, 311, 3, 302; 399/301
See application file for complete search history.

(56) References Cited

U.S. PATENT DOCUMENTS

| | | | | |
|---|---|---|---|---|
| 5,859,988 A * | 1/1999 | Ajanovic et al. | ............ | 710/306 |
| 5,935,233 A * | 8/1999 | Jeddeloh | ............ | 710/306 |
| 6,081,863 A * | 6/2000 | Kelley et al. | ............ | 710/312 |
| 6,134,621 A * | 10/2000 | Kelley et al. | ............ | 710/311 |
| 6,141,717 A * | 10/2000 | Yamanoi et al. | ............ | 710/306 |
| 6,182,178 B1 * | 1/2001 | Kelley et al. | ............ | 710/314 |
| 6,185,642 B1 * | 2/2001 | Beukema et al. | ............ | 710/60 |
| 6,237,057 B1 * | 5/2001 | Neal et al. | ............ | 710/309 |
| 6,295,568 B1 * | 9/2001 | Kelley et al. | ............ | 710/305 |
| 6,311,247 B1 * | 10/2001 | Spencer | ............ | 710/307 |
| 6,338,107 B1 * | 1/2002 | Neal et al. | ............ | 710/302 |
| 6,510,529 B1 * | 1/2003 | Alexander et al. | ............ | 714/11 |
| 6,799,238 B2 * | 9/2004 | Miller | ............ | 710/302 |
| 6,981,082 B2 * | 12/2005 | Ho et al. | ............ | 710/113 |
| 2003/0037198 A1 * | 2/2003 | Hunsaker | ............ | 710/313 |
| 2003/0046499 A1 * | 3/2003 | Lin | ............ | 711/154 |

* cited by examiner

*Primary Examiner*—Khanh Dang
*Assistant Examiner*—Christopher A Daley
(74) *Attorney, Agent, or Firm*—Kevin M. Hart

(57) ABSTRACT

An I/O bus architecture is configurable so that I/O bandwidth may be re-allocated from one I/O slot or device to another. A first intermediate bus couples a system bus interface device to a first I/O bus interface device. A second intermediate bus couples the system bus interface device to a switching device. The switching device functions to couple the second intermediate bus either to the first or to the second I/O bus interface device responsive to a steering signal. The steering signal may be configured to indicate whether or not an I/O device is coupled to the second I/O bus interface device. If so, then the second intermediate bus is coupled to the second I/O bus interface device; but if not, it is coupled to the first I/O bus interface device so that the first I/O bus interface device may utilize the extra I/O bandwidth not being used by the second I/O bus interface device.

18 Claims, 1 Drawing Sheet

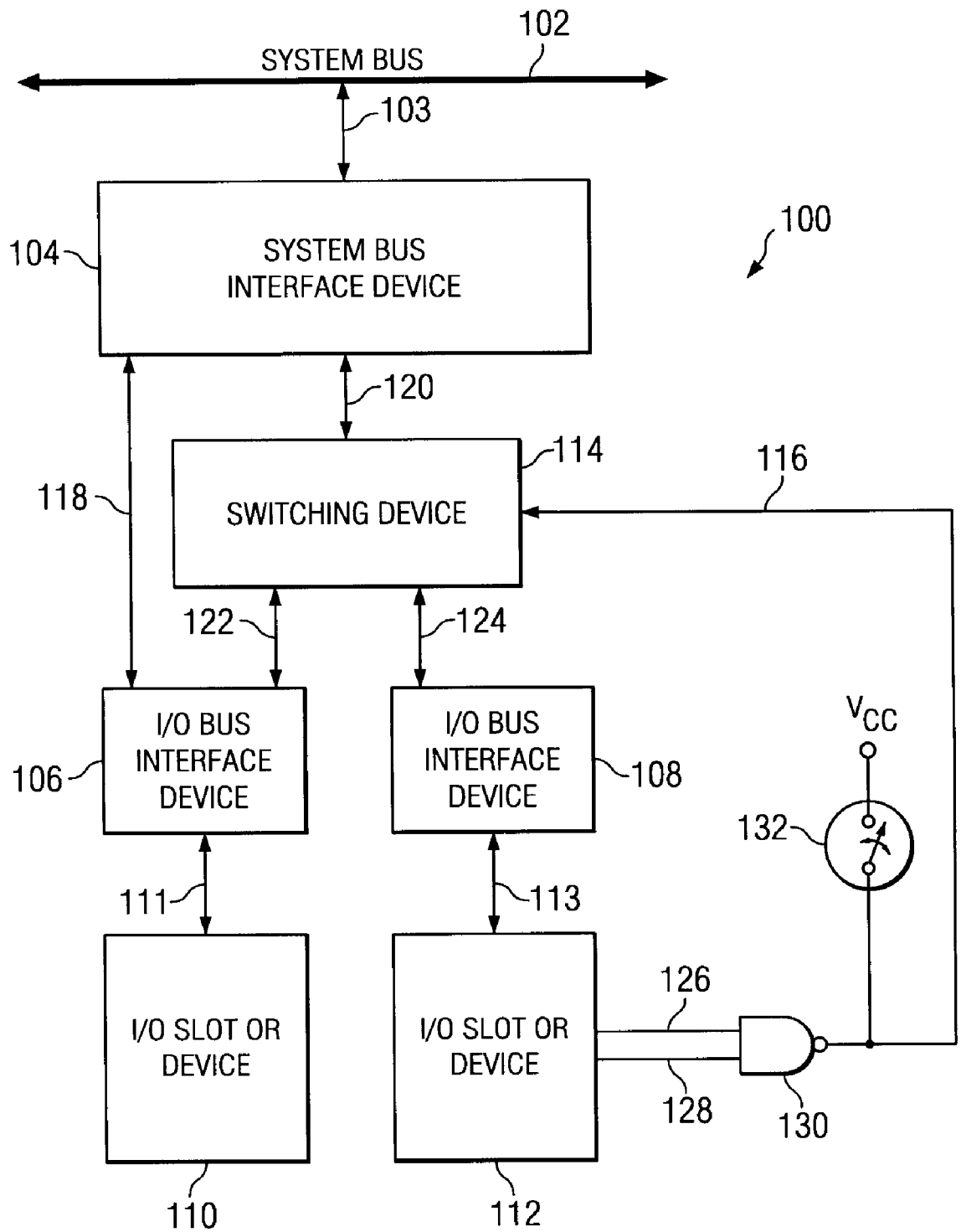

CONFIGURABLE I/O BUS ARCHITECTURE

FIELD OF THE INVENTION

This invention relates generally to computer systems, and more particularly to configurable input/output buses for computers.

BACKGROUND

Computer motherboards typically provide, among other things, a system bus and an input/output (I/O) bus. The system bus supports very high speed data exchanges and is used, for example, to interface one or more central processing units (CPUs) with a main memory or a main memory controller. The I/O bus generally interfaces with the system bus via a bus bridge and is used to exchange data with one or more I/O devices such as SCSI devices, network cards, graphics cards and the like. In computer systems having only a single I/O bus, multiple I/O devices must share the common I/O bus.

In high-performance computer systems, more than one I/O bus is sometimes provided. Such multi-I/O-bus configurations yield higher performance than conventional systems because they reduce the ratio of I/O devices to I/O buses. This in turn increases the available I/O bus bandwidth per I/O device. One illustrative example of such a multi-I/O-bus configuration is the "ropes" architecture developed by Hewlett-Packard Company and described in U.S. Pat. No. 6,311,247, which patent is hereby incorporated in its entirety.

In the ropes architecture, the system bus connects to a single system bus interface device, and the system bus interface device connects to multiple peripheral component interconnect (PCI) interface devices. In particular, separate intermediate buses called "rope" buses are used to couple the PCI interface devices to the system bus interface. The rope buses exchange data using fewer bits per bus clock than does the system bus. For example, the system bus might exchange data using one hundred or more bits per system bus clock (and commensurately as many data wires), while a rope bus might exchange data using ten bits per rope bus clock (using fewer data wires than the system bus uses).

In one configuration of the ropes bus architecture, each rope bus supports a separate PCI bus. In another configuration, two or more rope buses cooperatively support a single PCI bus. In the latter arrangement, the total bandwidth available for data exchanges over the single PCI bus is increased because more than one rope bus is dedicated to the single PCI bus. In either arrangement, however, the correspondence between PCI interface devices, rope buses, and PCI buses is fixed at the time of motherboard manufacture.

SUMMARY OF THE INVENTION

An I/O bus architecture according to a preferred embodiment of the invention is configurable, automatically or manually, so that I/O bandwidth may be allocated and re-allocated from one I/O slot or device to another. A system bus interface device is provided along with first and second I/O bus interface devices. A first intermediate bus couples the system bus interface device to the first I/O bus interface device. A second intermediate bus couples the system bus interface device to a switching device. The switching device functions to couple the second intermediate bus either to the first or to the second I/O bus interface device responsive to a steering signal. The steering signal may be generated automatically, or manually by means of a hand-operated switch.

In a further aspect, the steering signal may be configured to indicate whether or not an input/output device such as a circuit card is present and coupled to the second I/O bus interface device. If so, then the second intermediate bus is coupled to the second I/O bus interface device; but if not, it is coupled to the first I/O bus interface device so that the first I/O bus interface device may utilize the extra I/O bandwidth not being used by the second I/O bus interface device.

BRIEF DESCRIPTION OF THE DRAWINGS

FIG. 1 is block diagram illustrating a configurable I/O bus architecture according to a preferred embodiment of the invention.

DETAILED DESCRIPTION OF THE PREFERRED EMBODIMENTS

FIG. 1 illustrates, by way of example, a configurable I/O bus architecture 100 according to a preferred embodiment of the invention. A system bus 102 is coupled to a system bus interface device 104 via conductors 103. System bus interface device 104 may be any device operable (1) to interface a first intermediate bus 118 and a second intermediate bus 120 to system bus 102; and (2) to cause intermediate buses 118 and 120 to operate independently when supporting separate I/O buses, or jointly when supporting a single I/O bus. One example of such a system bus interface device is commercially available from Hewlett-Packard Company as part of the "ropes" bus architecture described herein above. (In the case of the ropes bus architecture, the system bus interface device is configurable via the system bus. For example, firmware in the host system may be used to configure the system bus interface device at start-up time to treat the intermediate buses separately or jointly.) Intermediate buses 118, 120 may be any type, including for example the rope bus type.

First and second I/O bus interface devices 106, 108 are coupled to first and second I/O slots or devices 110, 112 respectively via conductors 111, 113. I/O slots or devices 110, 112 may be any type of input/output bus slot or device, including for example any of those that are compliant with the popular PCI or PCI-X standards.

Intermediate bus 118 couples system bus interface device 104 to I/O bus interface device 106. Intermediate bus 120 couples system bus interface device 104 to a switching device 114. Switching device 114 may be any device operable to couple intermediate bus 120 either to I/O bus interface device 106 or to I/O bus interface device 108 responsive to a steering signal 116. For example, switching device 114 may be implemented using bidirectional arrays of field effect transistors (FETs), with steering signal 116 controlling the gates of the FETs. Depending on the state of steering signal 116, switching device 114 may couple intermediate bus 120 either to conductors 122 or to conductors 124.

Without more, the above-described architecture is useful to allocate and re-allocate I/O bandwidth from one I/O slot or device to another. When steering signal 116 is caused to assume a first state, and when system bus interface device 104 is caused to treat intermediate buses 118 and 120 independently, the I/O bandwidth provided by the two intermediate buses is allocated evenly between the two I/O slots or devices. But when steering signal 116 is caused to assume its second state, and when system bus interface device 104 is caused to treat intermediate buses 118 and 120 jointly, all of the I/O bandwidth provided by the two intermediate buses is allocated to a single I/O slot or device. The switching of steering signal 116 and the configuration of system bus interface device 104 may be accomplished by automatic means such as by computer control, or by manual means such as by hand-operated switches.

In the embodiment illustrated, one or more signals 126, 128 are provided by I/O slot or device 112 to indicate whether an I/O device is present and coupled to I/O bus interface device 108. For example, the PCI bus standard provides two such signals for determining whether a device is present (e.g. whether a card is present in an I/O slot), and if so how much power the device might consume. One of these types of device-present signals could be used alone to switch steering signal 116 between its first and its second states. (For example, the steering signal 116 can be made to follow the state of signal 126 or 128 or a similar signal on a different kind of I/O slot or device.) In the embodiment illustrated, steering signal 116 is derived from both of device-present signals 126, 128. Specifically, signals 126 and 128 are used as inputs to a logic gate such as NAND gate 130. Steering signal 116 is taken from the output of NAND gate 130.

It is also useful to provide a hand-operated manual override switch 132 to dictate whether bandwidth will be re-allocated from I/O slot or device 112 to I/O slot or device 110. In the embodiment illustrated, switch 132 is coupled to the output of gate 130 and can be used to cause steering signal 116 to go high even if device-present signals 126 and 128 are both high. Similarly, if an AND gate is used in lieu of the NAND gate, a switch can be coupled from the output of the AND gate through a resistor to ground to accomplish an analogous effect. Such a switch 132 might be used, for example, to re-allocate I/O bandwidth from I/O bus interface device 108 to I/O bus interface device 106 even when slot 112 is populated by a card. (Some I/O cards occupy more than one I/O slot physically, but do not require I/O bandwidth from both occupied slots.) For embodiments wherein steering signal 116 is derived from a single device-present signal, hand-operated switch 132 may be coupled to the steering signal in a pull-up or pull-down arrangement as appropriate, or logic gates may be employed to achieve a similar or identical effect.

While the invention has been described in detail in relation to preferred embodiments thereof, the described embodiments have been presented by way of example and not by way of limitation. It will be understood by those skilled in the art that various changes may be made in the form and details of the described embodiment resulting in equivalent embodiments that will remain within the scope of the appended claims. For example, in further embodiments, more than two I/O bus interfaces may be provided, and commensurately more intermediate buses. The described and claimed configurable I/O bus architecture may be scaled so that the bandwidth provided by numerous intermediate buses may be re-allocated to a single I/O slot or device. Indeed, a many-to-many switching arrangement may be employed, still in accordance with the invention as claimed, in order to allocate bandwidth freely across all I/O slots or devices in the system as needed.

We claim:

1. A configurable I/O bus architecture, comprising:
   a system bus interface device;
   first and second I/O bus interface devices;
   first and second intermediate buses;
   a switching device; and
   a steering signal; wherein:
   the first intermediate bus couples the system bus interface device to the first I/O bus interface device;
   the second intermediate bus directly couples the system bus interface device to the switching device; and
   the switching device is operable to couple the second intermediate bus either to the first or to the second I/O bus interface device responsive to the steering signal.

2. The configurable I/O bus architecture of claim 1:
   further comprising at least a first signal indicating whether an I/O device is coupled to the second I/O bus interface device; and
   wherein the steering signal is derived from the first signal such that the steering signal assumes a first state when the I/O device is so coupled and a second state when the I/O device is not so coupled.

3. The configurable I/O bus architecture of claim 2, wherein:
   the switching device couples the second intermediate bus to the second I/O bus interface device when the steering signal assumes the first state, and couples the second intermediate bus to the first I/O bus interface device when the steering signal assumes the second state.

4. The configurable I/O bus architecture of claim 2:
   further comprising a second signal indicating whether the I/O device is coupled to the second I/O bus interface device; and
   wherein the steering signal is derived from both the first and second signals using a logic gate.

5. The configurable I/O bus architecture of claim 1:
   further comprising a hand-operated switch; and
   wherein the steering signal is derived from the hand-operated switch such that the steering signal assumes a first state when the hand-operated switch is in a first position, and assumes a second state when the hand-operated switch is in a second position.

6. The configurable I/O bus architecture of claim 5, wherein:
   the switching device couples the second intermediate bus to the second I/O bus interface device when the steering signal assumes the first state, and couples the second intermediate bus to the first I/O bus interface device when the steering signal assumes the second state.

7. The configurable I/O bus architecture of claim 2:
   further comprising a hand-operated switch configured such that, when the hand-operated switch is in a first position, the state of the steering signal is unaffected, but when the switch is in a second position, the steering signal is forced into either its first or its second state.

8. The configurable I/O bus architecture of claim 4:
   further comprising a hand-operated switch coupled to the output of the gate and configured such that, when the hand-operated switch is in a first position, the state of the steering signal is unaffected, but when the switch is in a second position, the steering signal is forced into either its first or its second state.

9. The configurable I/O bus architecture of claim 1:
   wherein the first and second intermediate buses are rope buses.

10. The configurable I/O bus architecture of claim 1, wherein:
    the switching device is operable to directly couple the second intermediate bus either to the first or to the second I/O bus interface device responsive to the steering signal.

11. A configurable I/O bus architecture, comprising:
    a system bus interface device;
    first and second I/O bus interface devices;
    a switching device arranged to be responsive to a steering signal;

a first intermediate bus coupling I/O bandwidth of the first I/O bus interface device with I/O bandwidth of the system bus interface device; and a second intermediate bus coupling I/O bandwidth of the switching device with I/O bandwidth of the system bus interface device; wherein:

the switching device is arranged to couple I/O bandwidth of the second intermediate bus to I/O bandwidth of either the first or second I/O bus interface device responsive to the steering signal.

12. The configurable I/O bus architecture of claim 11:

further comprising a first signal indicating whether an I/O device is coupled to the second I/O bus interface device; and wherein the steering signal, in response to at least the first signal, indicates the I/O device coupled to the second I/O bus interface device and the I/O device not coupled to the second I/O bus interface device.

13. The configurable I/O bus architecture of claim 12, wherein:

the switching device couples the I/O bandwidth of the second intermediate bus to I/O bandwidth of the second I/O bus interface device in response to the steering signal indicating the I/O device coupled to the second I/O bus interface device and couples the I/O bandwidth of the second intermediate bus to I/O bandwidth of the first I/O bus interface device in response to the steering signal indicating the I/O device coupled to the first I/O bus interface device.

14. The configurable I/O bus architecture of claim 12:

further comprising a second signal indicating whether an I/O device is coupled to the second I/O bus interface device; and wherein the steering signal, in response to at least the first signal and the second signal, indicates the I/O device coupled to the second I/O bus interface device and the I/O device not coupled to the second I/O bus interface device.

15. The configurable I/O bus architecture of claim 11:

further comprising a hand-operated switch arranged to generate the steering signal, wherein the hand-operated switch in a first position generates the steering signal in a first state and the hand-operated switch in a second position generates the steering signal in a second state.

16. An I/O bus architecture comprising:

at least one first I/O bus interface device;

at least one second I/O bus interface device;

a switching device connected to the at least one first I/O bus interface device and the at least one second I/O bus interface device; and a system bus interface device connected to the at least one first I/O bus interface device and the switching device;

wherein the switching device is arranged to connect the system bus interface device to one of the at least one first I/O bus interface device and the at least one second I/O bus interface device responsive to a steering signal.

17. The I/O bus architecture of claim 16, wherein:

further comprising a first signal indicating whether an I/O device is coupled to the at least one second I/O bus interface device; and wherein the steering signal, in response to at least the first signal, indicates the I/O device coupled to the at least one second I/O bus interface device and the I/O device not coupled to the at least one second I/O bus interface device.

18. The I/O bus architecture of claim 17, wherein:

the switching device connects the at least one second I/O bus interface device to the system bus interface device in response to the steering signal indicating the I/O device coupled to the second I/O bus interface device and couples the at least one first I/O bus interface device to the system bus interface device in response to the steering signal indicating the I/O device coupled to the first I/O bus interface device.

* * * * *